US008565793B1

(12) United States Patent
Koodli

(10) Patent No.: US 8,565,793 B1
(45) Date of Patent: Oct. 22, 2013

(54) SYSTEM AND METHOD FOR SCOPED PAGING IN MULTI-RADIO HETEROGENEOUS NETWORKS

(75) Inventor: Rajeev Koodli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/472,306

(22) Filed: May 15, 2012

(51) Int. Cl.
*H04W 68/00* (2009.01)
*H04W 4/00* (2009.01)

(52) U.S. Cl.
USPC .......................................... 455/458; 370/329

(58) Field of Classification Search
USPC .......................... 455/458; 370/329; 379/333
See application file for complete search history.

(56) References Cited

U.S. PATENT DOCUMENTS

| | | | |
|---|---|---|---|
| 7,817,615 B1 | 10/2010 | Breau et al. | |
| 2002/0089952 A1 | 7/2002 | Cao et al. | |
| 2006/0128384 A1 | 6/2006 | Jagadeesan et al. | |
| 2006/0251104 A1 | 11/2006 | Koga | |
| 2008/0056210 A1* | 3/2008 | Yaqub | 370/338 |
| 2008/0181147 A1 | 7/2008 | Rydnell et al. | |
| 2009/0103491 A1 | 4/2009 | Zuniga et al. | |
| 2009/0232091 A1 | 9/2009 | Khan | |
| 2009/0245202 A1 | 10/2009 | Gras et al. | |
| 2009/0259736 A1 | 10/2009 | Chang et al. | |
| 2009/0293106 A1 | 11/2009 | Gray et al. | |
| 2010/0046369 A1 | 2/2010 | Zhao et al. | |
| 2010/0085884 A1 | 4/2010 | Srinivasan et al. | |
| 2010/0220680 A1* | 9/2010 | Ramankutty et al. | 370/329 |
| 2011/0263258 A1* | 10/2011 | Soliman et al. | 455/436 |
| 2012/0079559 A1 | 3/2012 | Reznik et al. | |
| 2012/0142352 A1 | 6/2012 | Zhang et al. | |
| 2012/0213072 A1 | 8/2012 | Kotecha et al. | |

OTHER PUBLICATIONS

U.S. Appl. No. 13/330,332, filed Dec. 19, 2011, entitled "System and Method for Resource Management for Operator Services and Internet," Inventors: Rajeev Koodli, et al.
U.S. Appl. No. 13/330,464, filed Dec. 19, 2011, entitled "System and Method for Resource Management for Operator Services and Internet," Inventors: Rajeev Koodli.
U.S. Appl. No. 13/369,373, filed Feb. 9, 2012, entitled "System and Method for Resource Management for Operator Services and Internet," Inventors: Rajeev Koodli, et al.
Action Wireless Broadband Corp., "OD200 WiMAX 802.16e Outdoor CPE: The Cost-Effective Outdoor Solution for WiMAX Service Deployment," DS_OD2_V1.00, Jul. 2009, 2 pages; www.AWBnetworks.com.
"WiMAX Deployment," WiMAX Base Station Demo at GEC 6, Nov. 17, 2009, 28 pages; http://groups.geni.net/geni/wiki/WiMAXInteg.
U.S. Appl. No. 13/690,847, filed Nov. 30, 2012, entitled "System and Method Associated With a Service Flow Router" Inventor: Arun Kavunder.

(Continued)

*Primary Examiner* — Opiribo Georgewill
(74) *Attorney, Agent, or Firm* — Patent Capital Group

(57) ABSTRACT

A method is provided in one example embodiment and includes receiving a request to page a mobile device operating in an idle state; determining a priority order for a geographic area identifier (GAI) list for the mobile device based on a metric; pruning the GAI list in order to identify one or more base stations; and sending a paging message to the one or more base stations. In more particular implementations, the GAI list can be maintained based on signaling at particular times associated with the network device. In addition, the paging message can include the GAI list corresponding to a plurality of cells.

18 Claims, 4 Drawing Sheets

(56) References Cited

OTHER PUBLICATIONS

U.S. Appl. No. 13/690,990, filed Nov. 30, 2012, entitled "Systm and Method Associated With a Service Flow Router" Inventor: Arun Kavunder.
USPTO Apr. 4, 2013 Non-Final Office Action from U.S. Appl. No. 13/330,332.
EPO Apr. 23,2013 European Search Report and Opinion from European Patent Application No. 12159101.0; 5 pages.
3GPP TS 24.312 V11.0.0 (Sep. 2011) Technical Specification, "$3^{rd}$ Generation Partnership Project: Technical Specification Group Core Network and Terminals; Access Network Discovery and Selection Function (ANDSF) Management Object (MO) (Release 11)," 3GPP Standard, $3^{rd}$ Generational Partnership Project (3GPP) , Mobile Competence Centre; 650 Route Des Lucioles; F-06921 Sophia-Antipolis Cedex, France; vol. CT WG1 No. V11.0.0, Sep. 2011, 157 pages.
3GPP TS 23.402 V11.1.1 (Dec. 2011) Technical Specification, "$3^{rd}$ Generation Partnership Project; Technical Specification Group Services and System Aspects; Architecture Enhancements for non-3GPP accesses (Release 11)," 3GPP Draft; 23401-B10_CRS_Implemented, $3^{rd}$ Generational Partnership Project (3GPP), Mobile Competence Centre; 650 Route Des Lucioles; F-06921 Sophia-Antipolis Cedex; France; Dec. 2011; 232 pages.

* cited by examiner

SYSTEM AND METHOD FOR SCOPED PAGING IN MULTI-RADIO HETEROGENEOUS NETWORKS

TECHNICAL FIELD

This disclosure relates in general to the field of communications and, more particularly, to a system and a method for scoped paging in multi-radio heterogeneous networks.

BACKGROUND

Wireless communication technologies are used in connection with many applications involving laptop computers, cellular telephones, user equipment, tablets, etc. Wireless communication technologies are tasked with handling increased amounts of data traffic, where the types of data being transported through mobile wireless networks have changed dramatically. This is because of device sophistication, which fosters data-intensive activities such as displaying movies, playing video games, readily attaching photographs to e-mails and text messages, etc. Moreover, video file-sharing and other types of usages (more traditionally associated with wired networks) have been gradually displacing voice as the dominant traffic in mobile wireless networks. This data intensive content burdens the network, as bandwidth is a finite resource. There is a significant challenge for system architects and mobile operators to maintain a stable/reliable network environment and, further, to optimize network resources, which engenders acceptable device performance for subscribers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a request to page a mobile device operating in an idle state; determining a priority order for a geographic area identifier (GAI) list for the mobile device based on a metric; pruning the GAI list in order to identify one or more base stations; and sending a paging message to the one or more base stations. In more particular implementations, the GAI list can be maintained based on signaling at particular times associated with the network device. In addition, the paging message can include the GAI list corresponding to a plurality of cells.

The mobile device can respond to the paging message with a service request for radio resource control (RRC) and bearer access. In addition, if the mobile device fails to respond to the paging message, then the GAI list is expanded in order to send a subsequent paging message to a plurality of different base stations. The paging message awakens the mobile device for receiving an incoming call. The method can also include provisioning a database with WiFi access point identifiers in conjunction with a corresponding list of geographic area identifiers for licensed radio cells. The method can also include updating the priority order dynamically based on a network service policy and at least one network condition.

The metric used to determine the priority order can be based on whether a particular GAI corresponds to a particular cell that belongs to licensed radio, which is integrated with a particular WiFi access point to which the mobile device is attached. In other cases, the metric used to determine the priority order can be based on which GAI corresponds to a closest proximity to a trusted WiFi access point to which the mobile device is attached. In still other instances, additional GAIs are subsequently evaluated in order to send additional paging messages to additional base stations. In yet other cases, the metric used to determine the priority order can be based on a frequently used GAI at a physical location corresponding to a trusted WiFi access point to which the mobile device is attached.

Example Embodiments

Figure 1:
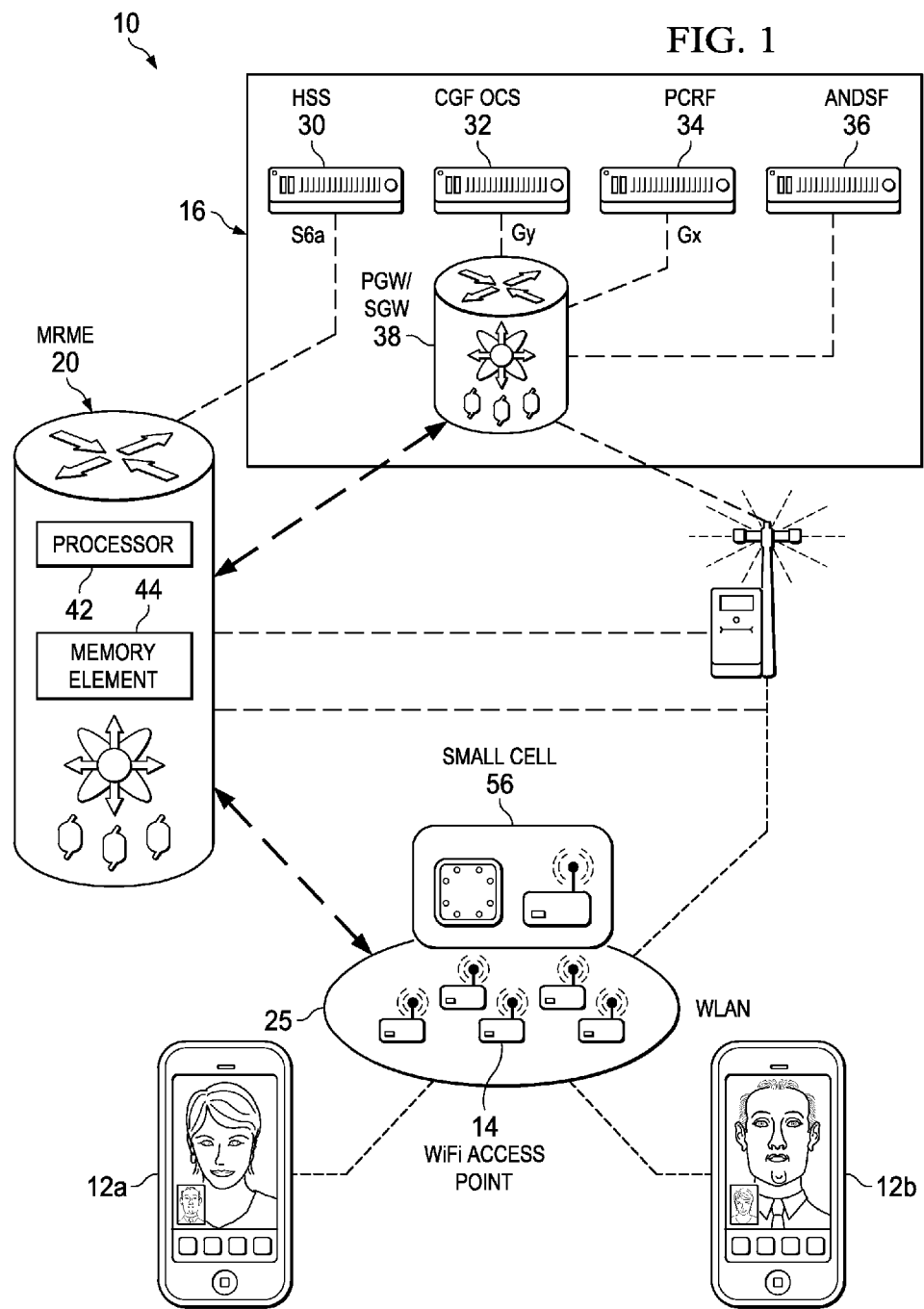
FIG. 1 is a simplified block diagram of a communication system for providing multi-radio management in accordance with one embodiment of the present disclosure.

Turning to FIG. 1, FIG. 1 is a simplified block diagram of a communication system 10 for providing multi-radio management for Internet and operator services in accordance with one embodiment of the present disclosure. More specifically, the architecture of communication system 10 can be configured for scoping a paging operation based on the knowledge of a trusted WiFi access point attachment in a multi-radio heterogeneous environment. By way of a brief introduction, the architecture is capable of scoping paging operations based on the knowledge of WiFi attachment and, thus, significantly narrows the physical realm of user equipment instances (UEs) that are camping on the licensed spectrum radio (i.e., either small cell or macrocell). This can reduce the number of base stations that an evolved packet core (EPC) control node would otherwise page. Additionally, these activities can reduce the number of cells over which a base station sends the paging message. Additional details associated with these operations and activities are provided below in the context of several examples that illustrate some of the capabilities of communication system 10.

Turning briefly to the infrastructure illustrated in FIG. 1, in a particular implementation, the architecture of FIG. 1 may work in conjunction with local area network (LAN) access and a long-term evolution (LTE) service, which may include a backhaul. Communication system 10 may include multiple instances of user equipment (UEs) 12a-x and one or more WiFi wireless access points (WAPs) 14, which collectively form a wireless LAN (WLAN) 25. In addition, FIG. 1 illustrates a small cell 56 and a multi-radio management entity (MRME) 20, which includes a processor 42 and a memory element 44.

In certain embodiments, the architecture of FIG. 1 may include infrastructure (generally indicated at arrow 16), which may include a packet data gateway/serving gateway (PGW/SGW) 38. PGW/SGW 38 is coupled to a home subscriber server (HSS) 30, a charging gateway function online charging system 32, a policy and charging rules function (PCRF) 34, and an access network delivery selection function (ANDSF) 36. Communications between these elements may occur over the S6a interface, the Gy interface, the Gx interface, or over any other suitable link or interface.

In operation, MRME 20 can be configured to perform subscriber admission control based on EPC subscriptions. Additionally, MRME 20 is configured to provide nomadic (or mobile) session decisions, EPC-equivalent quality of service (QoS) signaling. In addition, MRME 20 is configured to offer privileged access control, along with traffic routing rule delivery.

For purposes of illustrating certain example techniques of communication system 10, it is important to understand the typical communications that may be traversing the WiFi/cellular networks. The following foundational information may be viewed as a basis from which the present disclosure may be properly explained. Several deployments require access to the Internet and operator services via the LAN access (such as WiFi). For example, these can include residential broadband without wireline backhaul, hotspots, hotzones, high-density venues such as stadiums, etc.

LTE can provide backhaul technology for such deployments and offer a capacity savings for the operator, since a single EPS bearer is statistically multiplexed across multiple LAN users. LTE can also offer coverage relief for the operator because a LAN technology is used for access. In addition, the LTE framework offers a predictable service delivery based on known technology (without relying on 3rd parties). In such an architecture, the end users may use either the LAN or the cellular network to access the Internet and the operator services. Operators should also balance traffic across LAN and cellular networks. For example, when a user has both LAN and cellular access, the operator should be able to distribute the traffic load based on the suitability of services and access.

A macro network can cover a large area (e.g., 10-12 mile radius). A small cell has a smaller radius and, further, only covers a limited geography. In general terms, the radio of the small cell affects the coverage span. In crowded areas (e.g., a stadium, a mall, certain residential environments, etc.), a small cell can be deployed to service a group of users. The small cell generally has two components: licensed radio and unlicensed radio. The licensed radio of the small cell reflects the licensed spectrum. In the most basic terms, licensed spectrum is paid for, whereas unlicensed spectrum is not.

Increasingly, the small cell is being integrated with both licensed and unlicensed spectrum. A single radio is simply not capable of handling the bandwidth needs of a given user set that consumes significant data (e.g., downloading video, using Facebook, etc.). These data intensive activities cause significant demands on the licensed spectrum. Some individuals have responded to this dilemma by putting certain content onto the WiFi network. In many cases, service providers manage their network based on cost metrics (e.g., place YouTube videos on the WiFi network and allow Netflix streaming on the small cell).

The mobile devices being employed by given individual frequently jump between one network (e.g., the macro 3G network/4G network) and the WiFi network. The service provider can often lose control of the subscriber during this jumping back and forth between networks. The challenge lies in effectively coordinating the licensed radio and the unlicensed radio in the same environment. The integrated small cell reflects an attempt at managing the radio resources. More specifically, the convergence of licensed (3G, 4G) and unlicensed (WiFi) radio access networks has begun in the form of integrated small cells and macro networks.

Figure 2:
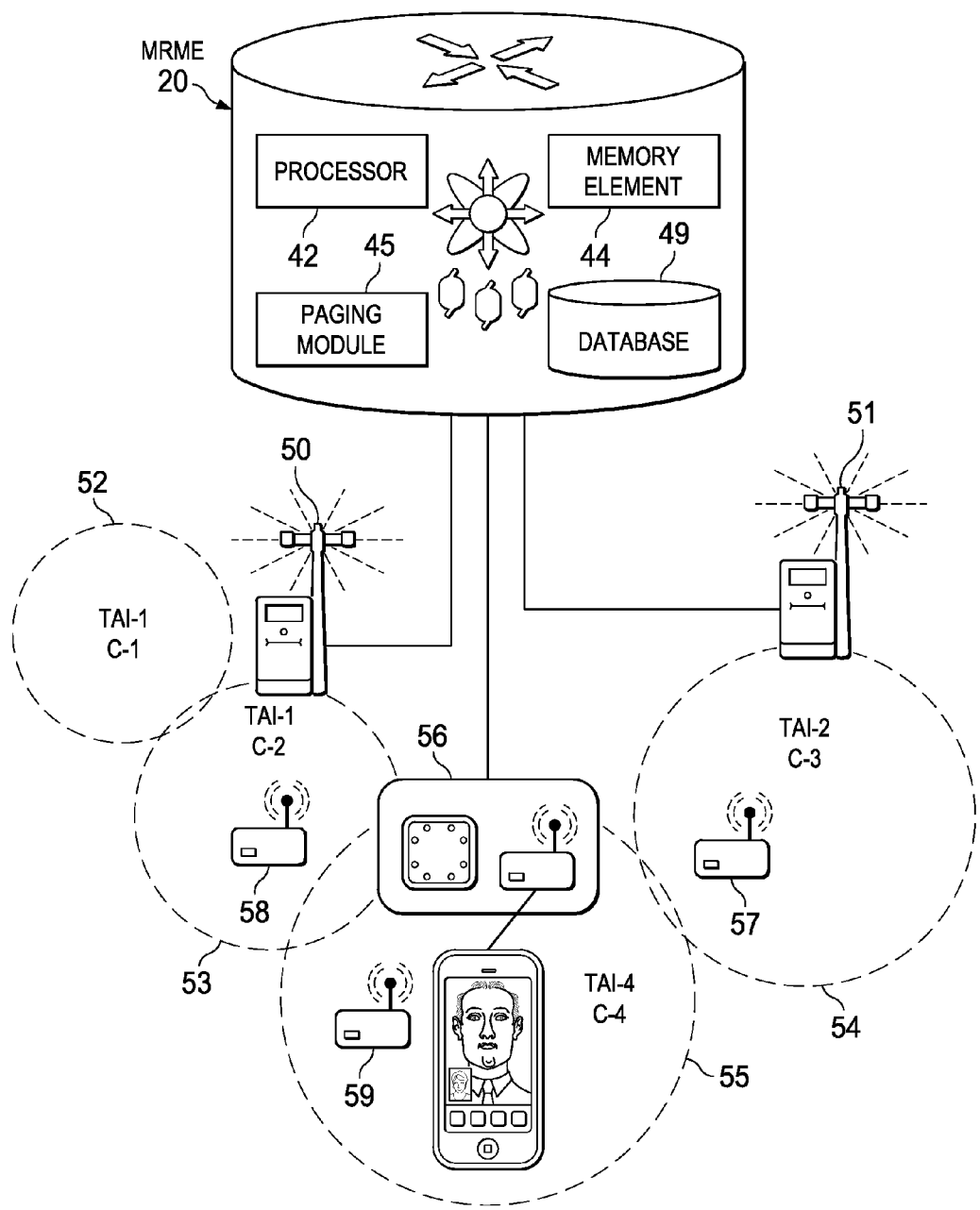
FIG. 2 is a simplified block diagram illustrating possible example details associated with the communication system.

Turning to FIG. 2, FIG. 2 is a simplified block diagram illustrating an example scenario of paging in a multi-radio heterogeneous network. FIG. 2 includes multiple instances of WiFi access points 57, 58, and 59, and multiple macrocells 50, 51. In addition, MRME 20 includes a paging module 45 and a database 49. This particular architecture includes multiple tracking area identifiers (TAIs) 52, 53, 54, and 55. Also illustrated are multiple cells (Cs) and, collectively, the TAIs and cells form the labelings being shown (e.g., TAI-1 C-1). A single macrocell (or a single small cell) can have multiple TAIs. A geographic area identifier (GAI) is the generic, broad name for the area identifier, whereas the TAI is a specific embodiment of the GAI. The TAI may be applicable to the 4G network (e.g., in E-UTRAN). In other examples, a routing area identifier (RAI) or a service area identifier (SAI) can equally be used in conjunction with the present disclosure. Hence, the geographic area identifier corresponds to different sets of identifiers in different RAT accesses.

When a given user is not using the phone (e.g., it is in an idle state), the screen of the mobile device may temporarily go blank. If the calling party is trying to reach that user, the mobile device should be woken up before the call can be received. This waking up process is called paging, which is a broad term used to include any activity associated with initiating contact with a mobile device, signaling the mobile device (e.g., to trigger a shift to a more active state), communicating with the mobile device to relay a certain condition, message, etc. Paging can require network resources, system resources, and/or radio resources.

A controller function understands that there is an incoming call for a particular mobile device. The controller (e.g., provisioned in MRME 20) has to send messages to various points in the network (e.g., base stations) to inquire about where a particular user is located. The mobile device can respond to the paging and then suitably receive the incoming call. Consider the case where the mobile is attached to the WiFi network, and the cell radio of the mobile device is dormant. When the call comes in, the controller of the mobile device has to decide which radio towers it has to connect to in order to reach the user and complete the call.

In accordance with the teachings of the present disclosure, and in the context of such multi-radio heterogeneous networks, mobile paging can be optimized by making use of a WiFi network attachment. Given a multi-radio heterogeneous network (with both licensed and unlicensed radios) in which a user equipment's attachment to WiFi is known at the EPC control node (e.g., MME in 4G), the architecture of the present disclosure resolves several common problems associated with managing paging activities. First, the architecture scopes (i.e., limits) the number of base stations (i.e., NB, eNB, Small-NodeB (sNB)) that receive a paging message from the EPC control node. Second, the architecture limits the number of tracking areas over which a base station would send a paging message.

Existing protocols (e.g., the 3GPP NAS specification (TS 24.301)) can specify the paging message. However, existing mechanisms do not specify the control logic at the EPC control node. Such intelligence can make use of knowledge of the WiFi attach, which can significantly scope the paging operation (i.e., given the relatively shorter physical coverage area of WiFi (where the UE is attached)).

In operation, the controller understands that the mobile device is somewhere within a certain radius of the small cell (e.g., 300-400 foot proximity). The controller can go straight to the base station that is updated with the WiFi information. In this way, the backbone network is being queried, as opposed to flooding the air interface/radio network. In essence, such activities limit the number of eNBs and small-cell NodeBs (sNB) to which paging messages would be otherwise sent. This can further reduce paging over the air interface by only including the most-relevant TAIs in the paging activities. A framework is provided in which the EPC control node is configured with a database of trusted WiFi access point identifiers, along with the corresponding list of geographic area identifiers for the licensed radio cells.

The most relevant TAI can be associated with a TAI of a cell collocated with the WiFi. In addition, the TAI of cell(s) in a priority order of proximity to the Wi-Fi AP to which the UE is attached can be used. In other cases, the most relevant TAI is the most frequently used TAIs at the AP location. Other TAI parameters and/or mobile device characteristics may also be used in order to intelligently prune paging activities. Any such parameters and characteristics are clearly within the broad teachings of the present disclosure.

In operation, the controller is tasked with deciding which of the radio base stations should receive the paging message (s). If the mobile network has been seen previously as being attached to the macrocell, then the paging message could be sent to the macrocell. If the controller understands that the mobile device is attached to the WiFi network, then it is also understood that the coverage area is a certain coverage area. The coverage area for the small cell could be one or more kilometers. If the mobile device has been seen within 400 feet of a small cell, the small cell radio can be asked to page the mobile device on the relevant TAI (e.g., TAI-4). The surrounding TAIs (e.g., TAI-1, TAI-2, and TAI-3) are effectively pruned away from these paging activities. Note that this intelligent paging stands in contrast to randomly interfacing with the macro base stations. Instead, the system goes straight to the small cell and requests it to page the mobile device (e.g., the UE) on TAI-4. Effectively, the backbone paging is eliminated (e.g., because attention is not being paid to the macrocells).

In addition, once the licensed radio is reached, there could be several possibilities (in terms of TAIs) for purposes of paging. Hence, the system is pruning the number of base stations that would be involved in paging. Additionally, once a particular base station is reached, only a single tracking area would be targeted. For the priority order of the GAI, if there is an understanding that the mobile node is attached to WiFi, the first entry in the priority order can be the small cell licensed radio box, which is collocated with the WiFi.

In operation, MRME 20 can also be configured to execute operations in order to engender a unified subscriber control. In a generic sense, MRME 20 is reflective of a centralized function: overseeing the management of different radio access technologies. For example, MRME 20 performs connection admission control of WiFi subscribers based on a combination of mobile network (3G, 4G) parameters (e.g., including the aggregate maximum bit rate (AMBR), allocation and retention priority (ARP), QoS class identifier (QCI), etc.). This can pertain to already admitted users at a WiFi access point, as well as the subscription information of a new attachment request. (Note that the terms 'mobile network' and 'cellular network' are interchangeable, as used herein.)

In certain cases, MRME 20 is configured to preempt an existing connection of a subscriber at a WiFi access point in favor of a new subscriber, who possesses better (preferred) subscription credentials. Furthermore, MRME 20 can preempt an existing connection of a subscriber at a WiFi access point in favor of a new subscriber possessing better subscription credentials. MRME 20 can subsequently provide a redirect service to the preempted subscriber so that the preempted subscriber could attach to a new WiFi access point.

Additionally, MRME 20 can perform privileged access control at a WiFi access point (e.g., a VIP lounge at an entertainment venue) in which MRME 20 verifies if the provided subscriber identity is allowed access at that particular WiFi access point. This can be achieved by consulting a local or external database consisting of geographical location of the WiFi access point, WiFi access point identifier, the service set identifier (SSID), a list of allowed users, etc. MRME 20 can be configured to provide a redirect service to a subscriber who is denied privileged access at a WiFi access point so that the subscriber can attempt connection to a different WiFi access point. In certain instances, MRME 20 can be configured to provide a redirect service to a privileged subscriber to attach to another WiFi access point with privileged access. This action may be performed, for instance, due to capacity limitation at the first WiFi access point.

In certain scenarios, MRME 20, after performing connection admission control and or privileged access control, performs the signaling of QoS parameters to the WiFi access network (represented by a gateway node) such that the WiFi access network is able to obtain those QoS parameters that are equivalent to the mobile network (3G, 4G) QoS parameters. This signaling is typically done at the time of connection establishment with the mobile network, but it may also be done at any other appropriate time. Specifically, MRME 20 is configured to signal the wireless connectivity object (WCO), which contains the equivalent parameters (including AMBR, ARP, QoS class identifier (QCI), and service data flow rules). A service data flow (SDF) represents traffic of particular kind such as the worldwide web, YouTube, Facebook, etc. The service data flow rules can identify the treatment of different subscriber traffic, as well as the charging characteristics for the identified service data flows. The charging characteristics provide the information for the WiFi access network gateway to generate billing records.

MRME 20, after performing the connection admission control and or privileged access control, can perform the signaling with the WiFi access network (represented by a gateway node) so that the WiFi access network gateway can establish the connectivity with the mobile network (represented by the mobile network gateway such as a PGW (in 4G LTE), GGSN (in 3G UMTS), HA (in 3G CDMA), etc.). Specifically, the signaling is performed to establish the tunnels from the WiFi access network gateway to the mobile network gateway, as well as from the WiFi access network gateway to the WiFi access point.

Additionally, MRME 20 can be configured to provide the mobile UE specific parameters (e.g., the WiFi access point, and the mobile network gateway IP address to the WiFi access network gateway) as new DHCP options or IPv6 Neighbor Discovery options in the router solicitation message. The UE specific parameters can include the IMSI, UE-QoS (as identified in the subscription), and UE link-layer identifier. The WiFi access point parameters include a tunnel endpoint IP address, a GRE (or other tunnel identifier) key, AP geographic location, etc.

As an alternative to DHCP or IPv6 Neighbor Discovery, MRME 20 may provide the required tunneling parameters in an authentication, authorization, and accounting (AAA) message. The net result is that the WiFi access network gateway is able to establish the tunnel with the mobile network gateway. Additionally, the WiFi access network gateway provides connectivity parameters back to the MRME as new DHCP or IPv6 Neighbor Discovery options. These parameters include the UE-specific parameters (such as the assigned IP address and other relevant parameters), as well as its own tunnel parameters (such as the tunnel endpoint IP address, GRE key, etc.). As an alternative to DHCP or IPv6 Neighbor Discovery, the WiFi access network gateway may provide the required tunneling parameters in an AAA message.

MRME 20 can subsequently signal the WiFi access point to establish a tunnel with the WiFi access network gateway. This signaling may include the tunnel endpoint parameters of the WiFi access network gateway, as well as the WiFi subscriber identification (such as the assigned IP address/prefix and/or the MAC layer address) as new parameters that can be realized in the 'Control And Provisioning of Wireless access points' (CAPWAP) protocol in a particular embodiment of the present disclosure. Such a tunnel could be on a per-subscriber basis, or provided as an aggregate tunnel for a group of subscribers attached to the WiFi access point.

In terms of the infrastructure of the present disclosure, UEs 12a-x can be associated with clients, customers, endpoints, handheld devices, or end users wishing to initiate a communication in communication system 10 via some network. The term 'UE' and the term 'mobile device' are inclusive of devices used to initiate a communication, such as a receiver, a computer, a router, a gateway, a network appliance, a proprietary device, a set-top box, an Internet radio device (IRD), a cell phone, a smartphone of any kind, a tablet, a personal digital assistant (PDA), an iPhone, an iPad, a Google Droid, or any other device, component, element, or object capable of initiating voice, audio, video, media, or data exchanges within communication system 10. UEs 12a-x may also be inclusive of a suitable interface to the human user, such as a display, a keyboard, a touchpad, a remote control, or other terminal equipment. UEs 12a-x may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

WAPs 14 are configured to connect one or more UEs 12a-x to a network (e.g., a WiFi network). WAPs 14 may resemble a network hub, relaying data between connected wireless devices (e.g., UEs 12a-x) in addition to a connected wired device (e.g., an Ethernet hub or switch). This allows wireless devices to communicate with other wired and wireless devices. Networks of the present disclosure represent a series of points or nodes of interconnected communication paths for receiving and transmitting packets of information that propagate through the architecture. Each network can offer a communicative interface between sources and/or hosts, and each may be any LAN, WLAN metropolitan area network (MAN), Intranet, Extranet, wide area network (WAN), virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

PCRF 34 may be configured to determine policy rules in real-time in a multimedia network. PCRF 34 can operate at a network core and access subscriber databases and other specialized functions, such as charging systems, in a scalable and centralized manner. PCRF 34 is the part of the network architecture that aggregates information to and from the network, operational support systems, and other sources (such as portals) in real time, supporting the creation of rules and then making policy decisions for each UE 12a-x active on the network. AAA nodes in the network may provide authentication, authorization, and accounting for UEs 12a-x accessing and using communication system 10. HSS 30 may provide management of a centralized subscriber database of UEs 12a-x accessing and using communication system 10.

Turning to the specific functions associated with the architecture of FIG. 1, for the PGW (offering a hierarchical UE context), this element should multiplex a UE (LTE-CPE) context among multiple WiFi UEs using the LTE-CPE. The WiFi UEs may already have their own contexts on the PGW since a WiFi UE is generally a UE with a service provider subscription. Hence, a data structure that links the existing mobile context of a UE to its WiFi context under the LTE-CPE context is sufficient. The policy rules for direct LTE access and WiFi access for the same UE can be different.

As a general summary, MRME 20 can be configured to provide the WiFi access point usage and the prevailing network information to the mobile network gateway, which in turn can provide traffic routing rules to MRME 20. Subsequently, MRME 20 can be configured to provide the traffic routing rules to the UE. The traffic routing rules determine the mapping of a particular traffic set to the corresponding radio technology. Such rules can be dynamic and dependent on such factors as the time of day, subscriber profile, etc. MRME 20 is configured to receive WiFi access point information upon each subscriber attaching or detaching (and/or at other configurable times). With the provided network health information, the mobile network gateway is configured to assign a particular traffic set to the appropriate radio technology. Such traffic routing information can be provided to the UE via MRME 20. In certain instances, MRME 20 can be configured to provide the traffic routing rules to the UE for the relevant radio technologies (3G, 4G, WiFi) as a set of new parameters in the 3GPP NAS protocol.

Figure 3A:
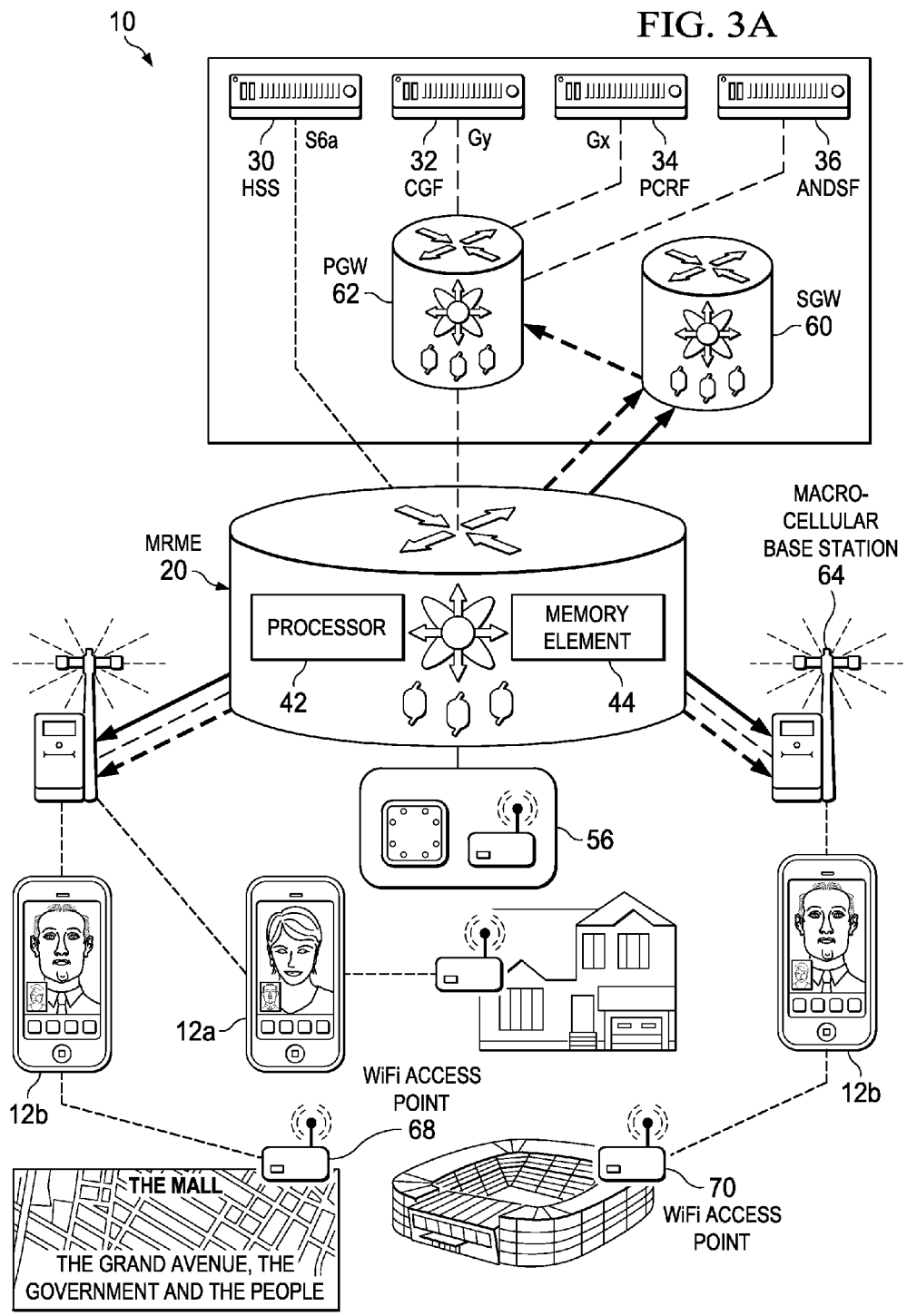
FIG. 3A is another simplified block diagram illustrating one potential scenario associated with the communication system.

FIG. 3A is a simplified block diagram illustrating an example scenario associated with communication system 10. The scenarios depicted in FIG. 3A can include high-density venues (e.g., concerts, stadiums, Times Square, certain residential areas, etc.). The actual connectivity for the UEs can be associated with any appropriate radio technology (e.g., 3G UMTS/CDMA, 4G LTE, WLAN, etc.). This particular example of FIG. 3A includes PGW 62 and SGW 60 as separate elements, although they may be collocated in other embodiments. In addition, a WiFi access point 70 is coupled to an evolved node B (eNB) 64, which may be reflective of a macrocellular base station. WiFi access point 70 is associated with a stadium in this particular example. In addition, a different access point 68 may be provisioned at a mall location. The radio resources can be provided by eNB 64, which can also provide radio resource management. Tunnel resource management can be provided by SGW 60, where packet data network (PDN) connection management is provided by PGW 62. Hence, management of radio resources (bandwidth, tunnels, links, connections, session continuity, handover/handoff, etc.) can readily be accommodated for a given mobile subscriber.

Multi-radio small cells offer a significant tool to enhance network coverage and capacity for mobile service providers. In certain environments, the mobile service provider can leverage the costs associated with deploying a small cell for cellular network to also include the WiFi as an access network. This enables the provider to use WiFi to support the burgeoning demand on capacity and to relieve congestion on cellular networks. However, the user experience can vary greatly on WiFi without adequate admission control and resource management. Embodiments of the present disclosure can use multi-radio information to make intelligent admission decisions such that a service provider can manage their overall network more intelligently and effectively.

When a mobile device has multi-radio capability, it can attach to more than one radio network simultaneously, for instance to LTE radio and WiFi. When a mobile service provider (MSP) controls cellular and WiFi access, as in a multi-radio metrocell in which the UE may be attached to the macrocell and WiFi or small cell and WiFi, it is important for the MSP to control the user experience while balancing the desire to offload traffic from cellular to WiFi. More specifically, the users at cell edges that generally receive poor macrocell experience should be given assured WiFi connectivity and experience compared to those having better cellular coverage (e.g., via a small cell). In addition, devices that are known to be high consumers of data (e.g., tablets) should be placed on WiFi if possible, based on the policy (such as the access point name (APN) configuration preference for the radio interface). In addition, the heavy data users also need to be placed on WiFi as much as possible. In addition, certain WiFi locations may have restricted access. Only those users with privileged access should be given WiFi connectivity.

MRME 20 can maintain knowledge of multiple radios (macrocellular, small cell, and WiFi), as well as the user attachments to those radios. MRME 20 can be configured with a database of outdoor WiFi access point identifiers (such as unique MAC addresses, or any other such identifier), global positioning system (GPS) locations, and the service set identifiers of interest. MRME 20 can also be configured with a database consisting of a set of WiFi access points that fall within a poor macrocellular coverage zone, which reflects an area of known poor connectivity experience (such as poor signal-to-noise ratio and geometry factor). MRME 20 may also include a database consisting of a Mobile Equipment Identity (MEI) mapped to the device type. For instance, knowing the MEI (IMEI or IMEISV), the database could retrieve whether the device is a smartphone or a tablet. Furthermore, MRME 20 may also include a database of heavy traffic users, obtained from an external analytics engine, which outputs data using a call detail record (CDR) on a mobile gateway. In addition, MRME 20 has the user's EPC subscription information such as their Gold/Silver/Bronze tiers, along with the allocated bit rates, etc.

In a particular implementation, MRME 20 can be provisioned in a control node such as an MME in the LTE/SAE architecture. MRME 20 can have a well-defined interface to the WiFi controller, which manages the WiFi access points, as well as the user attachment. The WiFi controller may physically reside inside the same node as MRME or it may reside elsewhere in the network with a secure connection to MRME 20. Similarly, MRME 20 communicates using a well-defined interface with the normal MME entity.

Figure 3B:
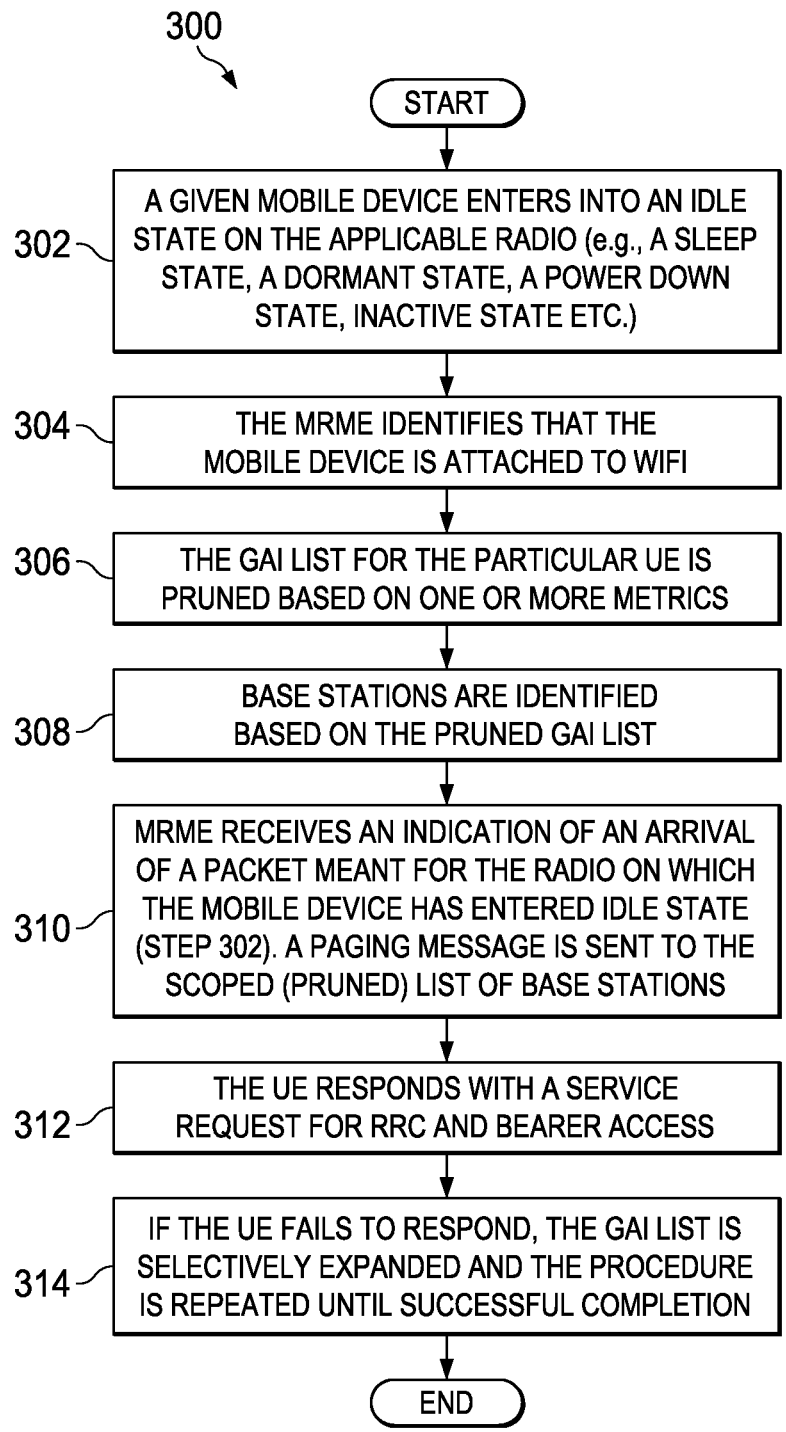
FIG. 3B is a simplified flowchart illustrating example activities associated with the communication system.

FIG. 3B is a simplified flow diagram 300 illustrating example activities associated with intelligent paging in a network environment. In this particular scenario, the system is essentially keying off the GAI that is used most, and trying that one first. At 302, a given mobile device enters into an idle state on the applicable radio (e.g., a sleep state, a dormant state, a power down state, inactive state etc.).

At 304, the MRME identifies that the mobile device is attached to WiFi (i.e., a WiFi wireless link). A database is provisioned (e.g., within MRME 20) and includes trusted WiFi access point identifiers, along with the corresponding list of geographic area identifiers for the licensed radio cells. For example, database 49 can include such information. Database 49 can also include a priority order of GAIs. The priority order can be dynamically programmable based on policy and network conditions.

One metric used to order the priority of the GAI in the database can be based on whether the GAI corresponds to a particular cell. The cell belongs to the licensed radio, which is integrated with the WiFi access point (to which the UE is attached) in the same small cell. Another metric that can be used to order the priority of the GAI in the database is based on which GAI corresponds to the closest proximity to the trusted WiFi access point to which the UE is attached. Subsequently, the next such GAI can be evaluated, and so forth, to continue intelligently limiting the paging operations. Yet another metric used to order the priority of the GAI in the database can be based on the most frequently used GAI at the physical location corresponding to the trusted WiFi access point to which the UE is attached (and the next such GAI, and so forth). Any other suitable metrics could be used to order the priority of the GAI in the database.

Provisioned with the above-described database, a control node (provisioned at any suitable network location) can perform the following operations when it is requested to page a UE in the idle state. At 306, the GAI list for the particular UE is pruned based on one or more metrics described above. Note that the control node can maintain such a list (e.g., TAI List) based on the UE signaling at various times (such as initial attach, tracking area updates for a variety of reasons, etc.). At 308, base stations are identified (NB, eNB, SmallNodeB, etc.) based on the pruned GAI list. At 310, the MRME receives an indication of an arrival of a packet meant for the radio on which the mobile device has entered idle state (of step 302). Note that, prior to step 310, the MRME may (on a continuous basis), perform GAI list maintenance operations (e.g., including but not limited to steps 308, 306 and 304) based on the knowledge of the mobile device's Wi-Fi connectivity and the cellular radio connectivity.

At 310, a paging message is sent to the scoped (pruned) list of base stations. With the above control logic, this list is relatively small and, in some cases, a single base station, (e.g., in the integrated Wi-Fi and licensed radio small cell). The paging message can include the list of GAI (corresponding to the cells) where the base station should then page the UE.

Subsequent to the paging by the base station, the UE responds with a service request (e.g., for RRC and bearer access), as specified in the current standard Specifications. This is reflected by 312. If the UE fails to respond, the EPC control node then selectively expands the GAI list, and then repeats the above procedure at 314 until success is achieved.

In terms of the infrastructure configured to perform certain activities discussed herein, MRME 20 and PGW/SGW 38 are network elements that can facilitate many of the processing, intelligent paging, and/or access activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, user equipment, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, MRME 20 includes software to achieve (or to foster) the paging activities discussed herein.

This could include the implementation of instances of various software modules (e.g., paging module 45) to perform these activities. Additionally, any of the elements of FIG. 1 can have an internal structure (e.g., a processor, a memory element, etc.) to facilitate some of the operations described herein. In other embodiments, these access activities may be executed externally to these elements, or included in some other network element to achieve the intended functionality. Alternatively, MRME 20 may include software (or reciprocating software) that can coordinate with other network elements in order to achieve the intelligent paging activities described herein. In still other embodiments, one or several devices may include any suitable algorithms, hardware, software, components, modules, interfaces, or objects that facilitate the operations thereof.

In certain example implementations, the intelligent paging functions outlined herein may be implemented by logic encoded in one or more non-transitory tangible media (e.g., embedded logic provided in an application specific integrated circuit [ASIC], digital signal processor [DSP] instructions, software [potentially inclusive of object code and source code] to be executed by a processor [processor 42 shown in FIG. 1], or other similar machine, etc.). In some of these instances, a memory element [memory element 44 shown in FIG. 1] can store data used for the operations described herein. This includes the memory element being able to store instructions (e.g., software, logic, code, etc.) that are executed to carry out the activities described in this Specification. The processor (e.g., processor 42) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the access activities as outlined herein. Additionally, each of these devices may include a processor that can execute software or an algorithm to perform the access management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a request to page a mobile device operating in an idle state;
   determining that the mobile device is attached to a WiFi access point, wherein a database is provisioned including trusted WiFi access point identifiers and a list of geographic area identifiers (GAIs) for licensed radio cells;
   determining a priority order for the GAI list for the mobile device based on a metric;
   pruning the GAI list in order to identify one or more base stations; and
   sending a paging message to the one or more base stations;
   wherein the metric used to determine the priority order is based on whether a particular GAI corresponds to a particular cell that belongs to licensed radio, which is integrated with the WiFi access point to which the mobile device is attached.

2. The method of claim 1, wherein the GAI list is maintained based on signaling at particular times associated with the mobile device.

3. The method of claim 1, wherein the paging message includes the GAI list corresponding to a plurality of cells.

4. The method of claim 1, wherein the mobile device responds to the paging message with a service request for radio resource control (RRC) and bearer access.

5. The method of claim 1, wherein if the mobile device fails to respond to the paging message, then the GAI list is expanded in order to send a subsequent paging message to a plurality of different base stations.

6. The method of claim 1, wherein the paging message awakens the mobile device for receiving an incoming call.

7. The method of claim 1, further comprising:
updating the priority order dynamically based on a network service policy and at least one network condition.

8. The method of claim 1, wherein the metric used to determine the priority order is based on which GAI corresponds to a closest proximity to the WiFi access point to which the mobile device is attached.

9. The method of claim 1, wherein additional GAIs are subsequently evaluated in order to send additional paging messages to additional base stations.

10. The method of claim 1, wherein the metric used to determine the priority order is based on a frequently used GAI at a physical location corresponding to the WiFi access point to which the mobile device is attached.

11. Non-transitory tangible media having encoded thereon logic that includes code for execution and when executed by a processor operable to perform operations, comprising:
receiving a request to page a mobile device operating in an idle state;
determining that the mobile device is attached to a WiFi access point, wherein a database is provisioned including trusted WiFi access point identifiers and a list of geographic area identifiers (GAIs) for licensed radio cells;
determining a priority order for the GAI list for the mobile device based on a metric;
pruning the GAI list in order to identify one or more base stations; and
sending a paging message to the one or more base stations;
wherein the metric used to determine the priority order is based on whether a particular GAI corresponds to a particular cell that belongs to licensed radio, which is integrated with the WiFi access point to which the mobile device is attached.

12. The non-transitory media of claim 11, wherein the GAI list is maintained based on signaling at particular times associated with the mobile device.

13. The non-transitory media of claim 11, wherein the paging message includes the GAI list corresponding to a plurality of cells.

14. The non-transitory media of claim 11, wherein the mobile device responds to the paging message with a service request for radio resource control (RRC) and bearer access.

15. The non-transitory media of claim 11, wherein if the mobile device fails to respond to the paging message, then the GAI list is expanded in order to send a subsequent paging message to a plurality of different base stations.

16. The non-transitory media of claim 11, wherein the paging message awakens the mobile device for receiving an incoming call.

17. A network element, comprising:
a memory element;
a processor operable to execute instructions such that the network element is configured for:
receiving a request to page a mobile device operating in an idle state;
determining that the mobile device is attached to a WiFi access point, wherein a database is provisioned including trusted WiFi access point identifiers and a list of geographic area identifiers (GAIs) for licensed radio cells;
determining a priority order for the GAI list for the mobile device based on a metric;
pruning the GAI list in order to identify one or more base stations; and
sending a paging message to the one or more base stations;
wherein the metric used to determine the priority order is based on whether a particular GAI corresponds to a particular cell that belongs to licensed radio, which is integrated with the WiFi access point to which the mobile device is attached.

18. The network element of claim 17, wherein the GAI list is maintained based on signaling at particular times associated with the network device, and wherein the paging message includes the GAI list corresponding to a plurality of cells.

* * * * *